US008616555B2

(12) United States Patent
Sridhar et al.

(10) Patent No.: US 8,616,555 B2
(45) Date of Patent: Dec. 31, 2013

(54) PACKING ASSEMBLY FOR RECIPROCATING PUMPS

(75) Inventors: Garud Sridhar, Singapore (SG); Mike Wedge, Sugar Land, TX (US); Joe Hubenschmidt, Sugar Land, TX (US); John Starr, Houston, TX (US); Terry Riddle, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 575 days.

(21) Appl. No.: 12/577,771

(22) Filed: Oct. 13, 2009

(65) Prior Publication Data

US 2010/0090409 A1    Apr. 15, 2010

Related U.S. Application Data

(60) Provisional application No. 61/104,927, filed on Oct. 13, 2008.

(51) Int. Cl.
*F16J 15/16* (2006.01)
*F16J 15/34* (2006.01)
*F16J 15/18* (2006.01)

(52) U.S. Cl.
USPC ............ 277/308; 277/375; 277/511; 277/519

(58) Field of Classification Search
USPC ......... 277/534–540, 375, 511, 519–521, 526, 277/308
See application file for complete search history.

(56) References Cited

U.S. PATENT DOCUMENTS

| 832,431 | A | * | 10/1906 | Stewart | 277/520 |
|---|---|---|---|---|---|
| 1,588,734 | A | * | 6/1926 | Hollander | 277/521 |
| 2,069,443 | A | * | 2/1937 | Hill | 277/329 |
| 2,370,964 | A | * | 3/1945 | Janette | 277/375 |
| 3,101,199 | A | * | 8/1963 | Hartnagel | 277/511 |
| 3,442,518 | A | * | 5/1969 | Henshaw | 277/528 |
| 3,490,775 | A | * | 1/1970 | Henshaw | 277/528 |
| 3,787,060 | A | * | 1/1974 | Astill | 277/516 |
| 3,955,673 | A | * | 5/1976 | Fosness | 277/511 |
| 4,039,198 | A | * | 8/1977 | Stanton | 277/520 |
| 4,099,726 | A | * | 7/1978 | Laible et al. | 277/312 |
| 4,330,135 | A | * | 5/1982 | Butterfield | 277/504 |
| 4,623,152 | A | * | 11/1986 | St Jean | 277/518 |
| 4,717,160 | A | * | 1/1988 | Zitting et al. | 277/584 |
| 5,049,031 | A | * | 9/1991 | Mintenko et al. | 415/112 |
| 5,297,805 | A | * | 3/1994 | Merkin et al. | 277/322 |
| 5,727,793 | A | * | 3/1998 | Gosselin | 277/308 |
| 6,003,875 | A | * | 12/1999 | Ellis et al. | 277/370 |
| 6,076,832 | A | | 6/2000 | Pow | |
| 6,098,986 | A | * | 8/2000 | Nowak | 277/345 |
| 6,308,960 | B1 | | 10/2001 | Peale | |
| 6,325,387 | B2 | * | 12/2001 | Shoemaker | 277/511 |
| 6,485,023 | B2 | | 11/2002 | Budrow et al. | |
| 6,561,517 | B2 | * | 5/2003 | James | 277/511 |
| 7,303,179 | B2 | * | 12/2007 | Bush et al. | 251/214 |
| 7,427,071 | B2 | | 9/2008 | Giggenbacher et al. | |

(Continued)

*Primary Examiner* — Vishal Patel
*Assistant Examiner* — Stacy Warren
(74) *Attorney, Agent, or Firm* — Myron K. Stout; Daryl Wright; Tim Curington

(57) ABSTRACT

A packing assembly adapted to be mounted on and seal a reciprocating shaft includes a packing nut, an elastomeric sealing member releasably coupled to the packing nut, and a keeper to facilitate the releasable coupling between the elastomeric sealing member and the packing nut, wherein the entire assembly is removable from the reciprocating shaft as a unit.

19 Claims, 3 Drawing Sheets

(56) References Cited

U.S. PATENT DOCUMENTS 7,963,502 B2 * 6/2011 Lovell et al. .................. 251/214
8,100,407 B2 * 1/2012 Stanton et al. ................ 277/511
2001/0001518 A1 * 5/2001 Shoemaker .................... 277/519
2001/0020771 A1 * 9/2001 Nishikawa ..................... 277/511
2009/0166980 A1 * 7/2009 Miller et al. ................... 277/529
2009/0302547 A1 * 12/2009 Roth ............................. 277/520

* cited by examiner

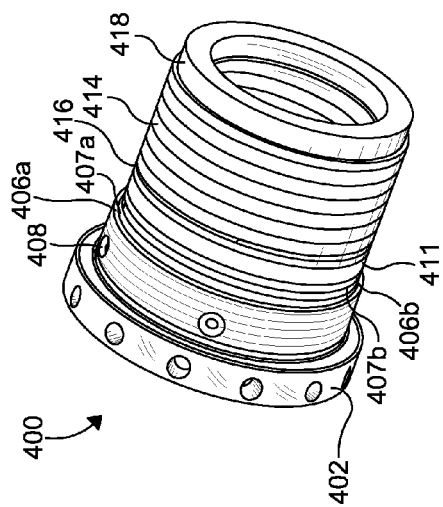
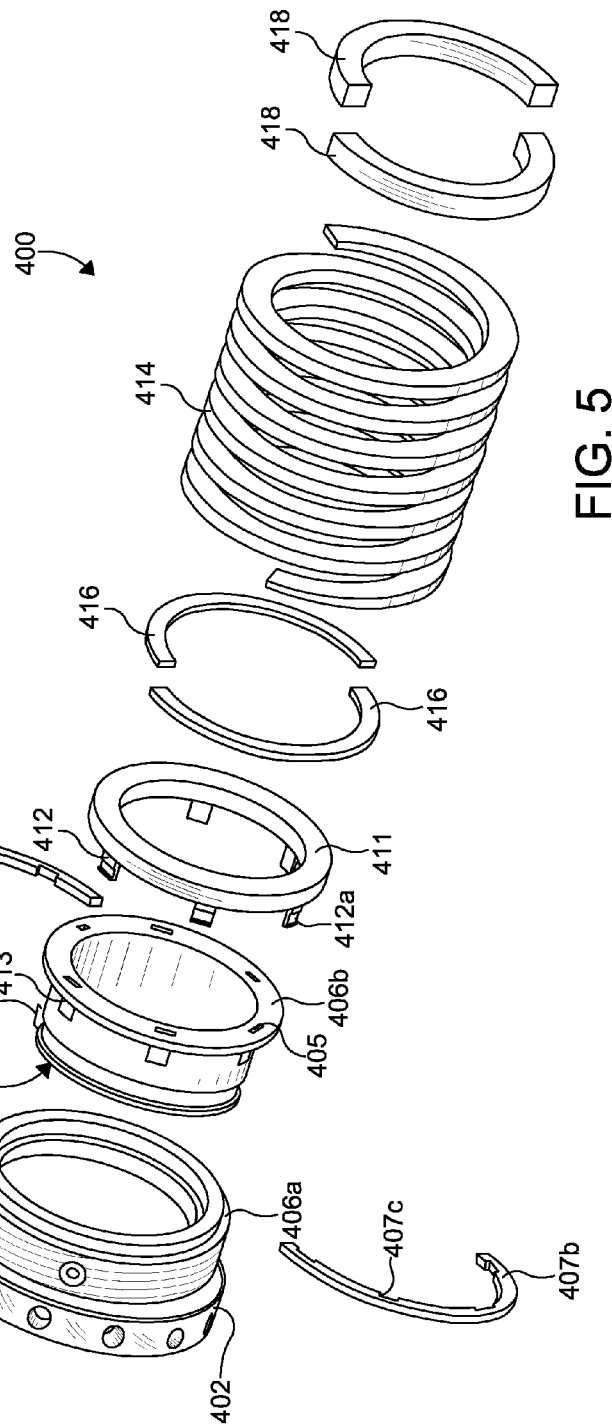
FIG. 4
FIG. 5

PACKING ASSEMBLY FOR RECIPROCATING PUMPS

CROSS-REFERENCE TO RELATED APPLICATION

This application is entitled to the benefit of, and claims priority to, provisional patent application Ser. No. 61/104,927 filed Oct. 13, 2008, the entire disclosure of which is incorporated herein by reference.

BACKGROUND OF THE INVENTION

The statements in this section merely provide background information related to the present disclosure and may not constitute prior art.

The invention is related in general to wellsite surface equipment such as wellsite pumping equipment and the like.

Packing is a term referring to the sealing elements in, for example, a fluid end of a positive displacement pump. Packing is contemplated to be an expendable item and is routinely replaced after a certain duration of use of the pump or if the packing gets damaged during use. As shown in FIG. 1, a packing assembly 10 of the prior art typically comprises a junk ring 1 having a header ring 2 disposed thereagainst. A pressure ring 3, a female adapter 4, and a spacer 5 are disposed against the header ring 2. The junk ring 1, the header ring 2, the pressure ring 3, the female adapter 4, and the spacer 5 abut an interior surface of a tubular fluid end body 7 and, in combination, form a sealing subassembly indicated generally at 9. An oil seal 6 is disposed against a packing nut 8 that, in combination with the subassembly 9, forms the packing assembly indicated generally at 10.

The packing can be adjustable or non-adjustable. Adjustable packing allows the packing nut to be tightened to provide further pressure on the packing. Non-adjustable packing ensures that the packing nut shoulders on the fluid end body and hence there is no adjustment.

In order to replace the packing, the process is fairly cumbersome and typically involves removing the fluid end cover plates, removing the plunger clamps, pulling the plunger out, removing and then replacing the packing, placing the plunger back in position, and placing the fluid end cover plates back in position.

It remains desirable to provide improvements in wellsite surface equipment in efficiency, flexibility, reliability, and maintainability.

SUMMARY OF THE INVENTION

An embodiment of a packing assembly adapted to be mounted on and seal a reciprocating shaft comprises: a packing nut; an elastomeric sealing member releasably coupled to the packing nut; and a keeper to facilitate the releasable coupling between the elastomeric sealing member and the packing nut, wherein the entire assembly is removable from the reciprocating shaft.

Another embodiment of a packing assembly adapted to be mounted on and seal a reciprocating shaft comprises: a packing nut including a flanged portion and shoulder portion; an elastomeric sealing member releasably coupled the shoulder portion of the packing nut; and a keeper to facilitate the releasable coupling between the elastomeric sealing member and the packing nut, wherein the entire assembly is removable from the reciprocating shaft.

In an embodiment, a method for servicing a seal for a reciprocating shaft is disclosed.

One method comprises the steps of: providing a packing assembly mounted to a reciprocating shaft, wherein the assembly includes a packing nut, an elastomeric sealing member releasably coupled to the packing nut, and a keeper to facilitate the releasable coupling between the elastomeric sealing member; and removing the packing nut from the reciprocating shaft such that the entire packing assembly in unitarily removed from the reciprocating shaft.

BRIEF DESCRIPTION OF THE DRAWINGS

These and other features and advantages of the present invention will be better understood by reference to the following detailed description when considered in conjunction with the accompanying drawings wherein:

FIG. 4 is a perspective view of a split packing assembly according to another embodiment of the present invention; and FIG. 5 is an exploded perspective view of the split packing assembly of FIG. 4.

DETAILED DESCRIPTION OF THE INVENTION

Figure 1:
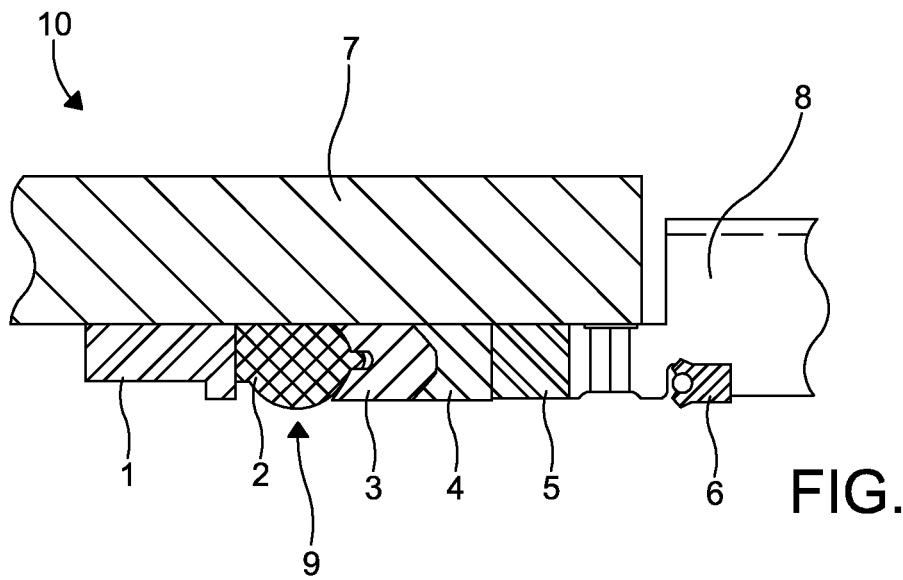
FIG. 1 is a cross sectional view of a portion of a packing assembly of the prior art.
Figure 2:
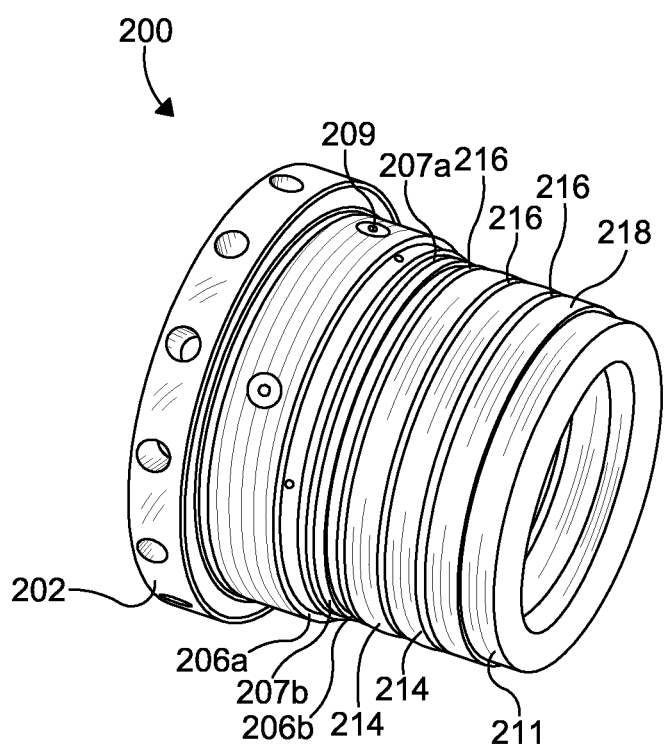
FIG. 2 is a perspective view of a split packing assembly according to an embodiment of the present invention.
Figure 3:
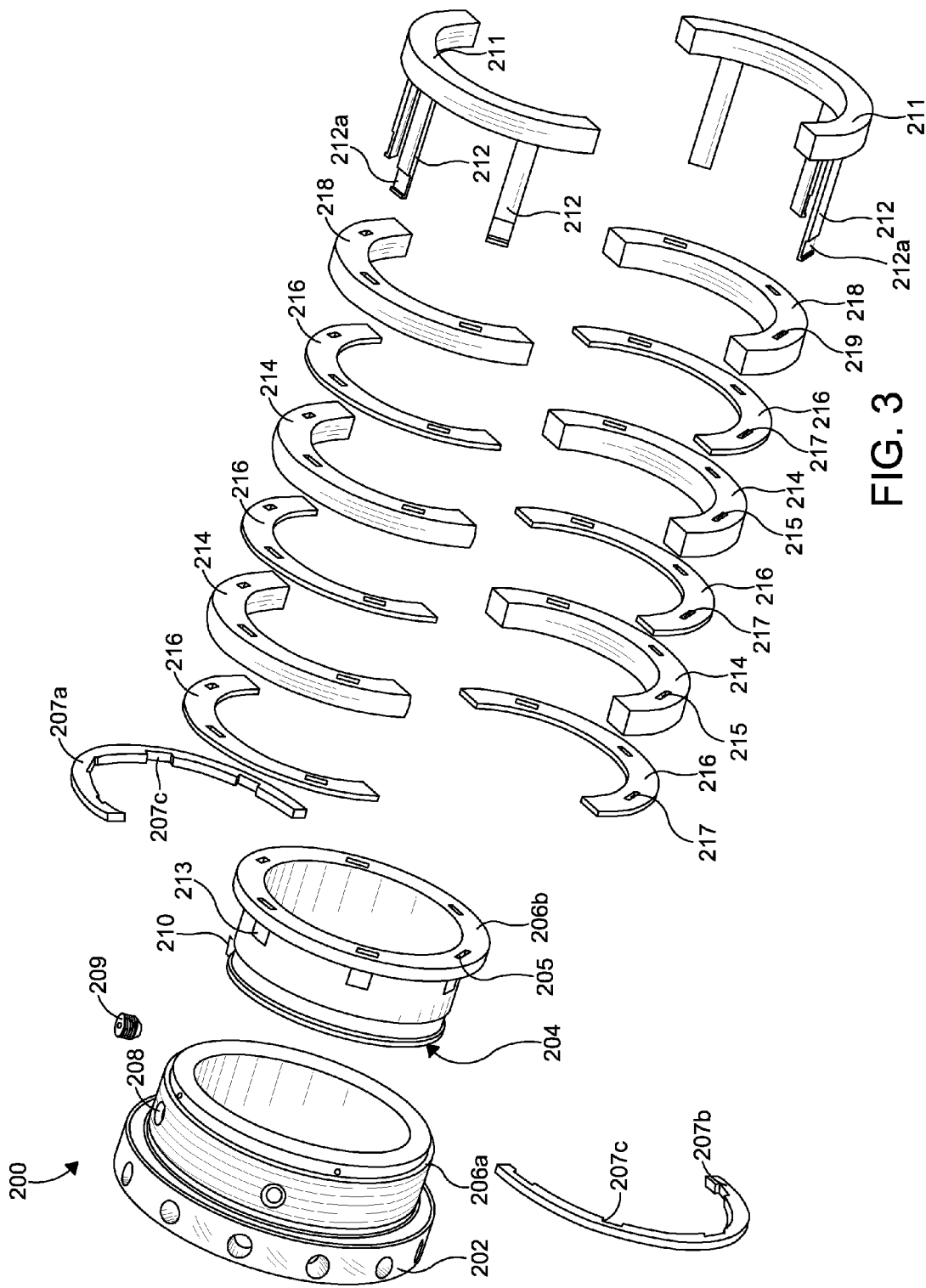
FIG. 3 is an exploded perspective view of the split packing assembly of FIG. 2.

Referring now to FIGS. 2 and 3, there is shown an embodiment of the invention in the form of a tubular split packing assembly, indicated generally at 200. The split packing assembly 200 comprises a packing nut 202 that includes a removable flanged portion 204. The portion 204 is inserted into the nut 202 leaving a gap between a shoulder 206a on the nut and a shoulder 206b on the portion 204 for receiving a plurality of retaining devices 207a, 207b. As shown, the retaining devices 207a, 207b are C-shaped clamps having a radius of curvature substantially the same as an outside curvature of the flanged portion 204. As a non-limiting example, the retaining devices 207a, 207b have a circumferential length that extends more than 180 degrees around a periphery of the portion 204 to secure the retaining devices 207a, 207b to the portion 204. As such a part of the retaining devices 207a, 207b may overlap each other along a longitudinal axis of the portion 204. As a further example, the retaining devices 207a, 207b have a resiliency to allow a mouth of the C-shape to expand and thereby allow the retaining devices 207a, 207b to "clamp" onto the portion 204.

In certain embodiments, the packing nut 202 includes a plurality of apertures 208 formed therein, wherein each aperture 208 is adapted to receive a threaded locking pin 209. The pins 209 engage the portion 204 to releasably attach to the nut 202. As a non-limiting example, the portion 204 includes an annular channel 210 formed therein to receive the pins 209 and thereby secure the portion 204 to the packing nut 202.

A split keeper 211 releasably attaches via a plurality of fingers 212 to the shoulder 206b on a free end of the packing nut 202. A free end of each of the fingers 212 extends through an associated slot 205 formed in the shoulder 206b and is engaged by the retaining devices 207a, 207b. In the embodiment shown, the retaining devices 207a, 207b each include a plurality of notches 207c formed therein and aligned with the slots 205 to receive the fingers 212. Specifically, each of the fingers 212 includes a notch 212a formed therein and adapted to cooperate with the notches 207c of the retaining devices 207a, 207b to secure the keeper 211 to the portion 204. The portion 204 also includes a plurality of receiving channels 213 formed therein and aligned with the slots 205 to receive the fingers 212.

The fingers 212 are sized to accommodate a series of alternating ring-shaped split elastomeric seals 214 and anti-extrusion members 216. The seals 214 and the anti-extrusion members 216 have slots 215, 217 respectively formed therein through which the fingers 212 extend. A wiper ring 218 is positioned between the keeper 211 and one of the members 216 and includes a plurality of slots 219 through which the fingers 212 extend. When the assembly 200 is installed, for example in a fluid end of a reciprocating pump, such as a positive displacement fracturing pump or the like, a shaft to be sealed (not shown) extends through the inner diameter of the components of the assembly 200. Preferably, the packing assembly 200 comprises at least two seals 214 but those skilled in the art will appreciate that the number of seals 214 in the assembly 200 may be varied depending on the needs of the system for which the assembly 200 is designed.

Because the keeper 211 holds the seals 214, the anti-extrusion members 216 and the wiper ring 218 in place, the entire assembly 200 may be removed from the shaft and easily maintained or replaced with a new assembly 200, greatly simplifying the work required for packing maintenance and improving the maintainability of the pump or any other device to which the assembly 200 is attached. The split geometry of the keeper 211, the seals 214, the anti-extrusion members 216 and the wiper ring 218 is advantageous at least in part because of the time savings involved in the replacement of the assembly 200.

There is shown in FIGS. 4 and 5 an embodiment of the invention comprising a helical packing assembly, indicated generally at 400. The helical packing assembly 400 comprises a packing nut 402 that includes a removable flanged portion 404. The portion 404 is inserted into the nut 402 leaving a gap between a shoulder 406a on the nut and a shoulder 406b on the portion 404 for receiving a plurality of retaining devices 407a, 407b. As shown, the retaining devices 407a, 407b are C-shaped clamps having a radius of curvature substantially the same as an outside curvature of the flanged portion 404. As a non-limiting example, the retaining devices 407a, 407b have a circumferential length that extends more than 180 degrees around a periphery of the portion 404 to secure the retaining devices 407a, 407b to the portion 404. As such a part of the retaining devices 407a, 407b may overlap each other along a longitudinal axis of the portion 404. As a further example, the retaining devices 407a, 407b have a resiliency to allow a mouth of the C-shaped retaining devices 407a, 407b to expand and thereby allow the retaining devices 407a, 407b to "clamp" onto the portion 404.

In certain embodiments, the packing nut 402 includes a plurality of apertures 408 formed therein, wherein each aperture 408 is adapted to receive a threaded locking pin 409. The pins 409 engage the portion 404 to releasably attach the portion 404 to the nut 402. As a non-limiting example, the portion 404 includes an annular channel 410 formed therein to receive the pins 409 and thereby secure the portion 404 to the packing nut 402. As a further example, a wiper ring (not shown) may be coupled to the packing nut 402.

A split or non-split keeper 411 releasably attaches via a plurality of fingers 412 to the shoulder 406b on a free end of the packing nut 402. A free end of each of the fingers 412 extends through an associated slot 405 formed in the shoulder 406b and is engaged by the retaining devices 407a, 407b. In the embodiment shown, the retaining devices 407a, 407b each include a plurality of notches 407c formed therein and aligned with the slots 405 to receive the fingers 412. Specifically, each of the fingers 412 includes a notch 412a formed therein and adapted to cooperate with the notches 407c of the retaining devices 407a, 407b to secure the keeper 411 to the portion 404. The portion 404 also includes a plurality of receiving channels 413 formed therein and aligned with the slots 405 to receive the fingers 412.

The helical packing assembly 404 further includes a helical seal member 414 disposed between a pair of split end pieces 416, 418. The seal member 414 is coupled to each of the end pieces 416, 418 using any conventional means for bonding such as an adhesive and a fusing process, for example. The end pieces 416, 418 may further be coupled to the keeper 411 by any conventional means for bonding such as an adhesive and a fusing process. It is understood that the seal member 414 and the end pieces 416, 418 may be integrally formed in a manufacturing process or separately formed and coupled during a later process. It is further understood that the end pieces 416, 418 provide a protective barrier between the seal member 414 and adjacent components. In certain embodiments, the end pieces 416, 418 militate against extrusion of the seal member 414. One of the end rings 416, 418 is also releasably coupled to the keeper 411 using a conventional coupling means such as a screw (not shown), for example. At least one of the end rings 416, 418 can function as a wiper ring.

When the assembly 400 is installed, for example in a fluid end of a reciprocating pump, such as a positive displacement fracturing pump or the like, a shaft to be sealed (not shown) extends through the inner diameter of the components of the assembly 400. Because the sealing member 414 and end pieces 416, 418 are coupled to the keeper 411 and the keeper 411 is coupled to the packing nut 402, the entire assembly 400 may be removed from the shaft and easily maintained or replaced with a new assembly 400, greatly simplifying the work required for packing maintenance and improving the maintainability of the pump or any other device to which the assembly 400 is attached.

The helical geometry of the seal member 414 is advantageous because of the fewer number of components of the assembly 400 and because of the time savings involved in the replacement of the assembly 400.

The use of the assembly 200 or 400 will ensure that the packing is pulled out when the packing nut 202 or 402 is removed. The wiper rings 218, 418 (or 416) advantageously enables a partial clean up of the shaft during removal of the assembly 200 or 400.

The seal members 214 or 414 are preferably formed from an elastomeric material including, but not limited to, nitrile butadiene rubber (NBR), hydrogenated nitrile butadiene rubber (HNBR), fluoropolymers, and crosslinked nitrile butadiene rubber (XNBR).

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A method for servicing a seal for a reciprocating shaft, the method comprising the steps of:

providing a packing assembly mounted to a reciprocating shaft, wherein the assembly includes a packing nut including a shoulder portion, at least one split elastomeric sealing member releasably coupled to the shoulder portion of the packing nut, and a keeper having an elongated finger extending from one end of the keeper to releasably engage the packing nut; and removing the packing nut from the reciprocating shaft by engaging a notch of the elongated finger engaged with one or more retaining devices adapted to constrain axial displacement of the keeper with respect to the packing nut such that the packing nut, the at least one split elastomeric sealing member, the keeper, and the one or more retaining devices are unitarily removable from the reciprocating shaft.

2. The method of claim 1, wherein the at least one split elastomeric sealing member includes a helical seal member.

3. The method of claim 1, wherein the packing assembly further includes a wiper element coupled to the packing nut for cleaning the reciprocating shaft during a removal of the packing nut.

4. A packing assembly adapted to be mounted on and seal a reciprocating shaft, the assembly comprising:
a packing nut including a shoulder portion;
at least one split elastomeric sealing member releasably coupled to the shoulder portion of the packing nut;
a keeper having an elongated finger extending from one end of the keeper to releasably engage the packing nut and releasably couple the at least one split elastomeric sealing member to the packing nut, wherein the elongated finger defines a notch therein; and,
one or more retaining devices engaging the notch of the elongated finger, so as to constrain axial displacement of the keeper with respect to the packing nut, wherein the packing nut, the at least one split elastomeric sealing member, the keeper, and the one or more retaining devices are removable from the reciprocating shaft as a unit.

5. The packing assembly of claim 4, further comprising a wiper element coupled to the packing nut to clean the shaft during removal of the packing assembly.

6. The packing assembly of claim 4, wherein the at least one split elastomeric sealing member includes a plurality of split seal members.

7. The packing assembly of claim 6, further comprising a split anti-extrusion member disposed between adjacent split seal members.

8. The packing assembly of claim 4, wherein the at least one split elastomeric sealing member includes a helical seal member.

9. The packing assembly of claim 4, wherein the at least one split elastomeric sealing member is formed from one of NBR, HNBR, and XNBR.

10. The packing assembly of claim 4, wherein the at least one split elastomeric sealing member includes an aperture to receive the elongated finger therethrough, and wherein the at least one split elastomeric sealing member is disposed between the keeper and the packing nut.

11. The packing assembly of claim 4, wherein the one or more retaining devices comprise a notch adapted to engage the notch of the elongated finger.

12. A packing assembly adapted to be mounted on and seal a reciprocating shaft, the assembly comprising:
a packing nut including a flanged portion and shoulder portion;
at least one split elastomeric sealing member releasably coupled to the shoulder portion of the packing nut; and
a keeper having a base and an elongated finger extending from one end of the keeper to releasably engage the packing nut at a distal end of the elongated finger and releasably couple the at least one split elastomeric sealing member to the shoulder portion of the packing nut, wherein the elongated finger defines a notch therein and is integrally formed with the base;
one or more retaining devices received at least partially around the packing nut and engaging the notch of the elongated finger so as to constrain axial displacement of the keeper with respect to the packing nut, and wherein the packing nut, the at least one split elastomeric sealing member, the keeper, and the one or more retaining devices are removable from the reciprocating shaft as a unit.

13. The packing assembly of claim 12, further comprising a wiper element coupled to the packing nut to clean the shaft during removal of the packing assembly.

14. The packing assembly of claim 12, wherein the at least one split elastomeric sealing member includes a plurality of split seal members.

15. The packing assembly of claim 14, further comprising a split anti-extrusion member disposed between adjacent split seal members.

16. The packing assembly of claim 12, wherein the at least one split elastomeric sealing member includes a helical seal member.

17. The packing assembly of claim 12, wherein the at least one split elastomeric sealing member is formed from one of NBR, HNBR, and XNBR.

18. The packing assembly of claim 12, wherein the one or more retaining devices is disposed around a periphery of the flanged portion of the packing nut to secure the elongated finger to the packing nut.

19. The packing assembly of claim 12, wherein the at least one split elastomeric sealing member includes an aperture to receive the elongated finger therethrough, and wherein the at least one split elastomeric sealing member is disposed between the keeper and the packing nut.

* * * * *